US007696486B2

(12) United States Patent
Dangendorf et al.

(10) Patent No.: US 7,696,486 B2
(45) Date of Patent: Apr. 13, 2010

(54) TIME-RESOLVED, OPTICAL-READOUT DETECTOR FOR NEUTRON AND GAMMA-RAY IMAGING

(75) Inventors: Volker Dangendorf, Braunschweig (DE); Christoph Kersten, Braunschweig (DE); David Vartsky, Yavne (IL); Mark Goldberg, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 242 days.

(21) Appl. No.: 11/718,260

(22) PCT Filed: Nov. 1, 2005

(86) PCT No.: PCT/IL2005/001143

§ 371 (c)(1),
(2), (4) Date: Aug. 30, 2007

(87) PCT Pub. No.: WO2006/048871

PCT Pub. Date: May 11, 2006

(65) Prior Publication Data

US 2009/0078881 A1    Mar. 26, 2009

(51) Int. Cl.
*G01T 3/06* (2006.01)
(52) U.S. Cl. .................................. 250/390.11
(58) Field of Classification Search ............................... 250/390.01–390.12
See application file for complete search history.

(56) References Cited

U.S. PATENT DOCUMENTS

| | | | | |
|---|---|---|---|---|
| 3,426,195 A | * | 2/1969 | Menefee et al. | 250/485.1 |
| 4,215,274 A | * | 7/1980 | Segall | 250/361 R |
| 5,308,986 A | | 5/1994 | Walker et al. | |
| 5,317,160 A | * | 5/1994 | Hilbert et al. | 250/390.12 |
| 6,021,241 A | * | 2/2000 | Bilbro et al. | 385/37 |
| 2006/0163487 A1 | * | 7/2006 | Ambrosi et al. | 250/390.01 |

OTHER PUBLICATIONS

Nagarkar et al., "Structured LiI scintillator for thermal neutron imaging," 2001, IEEE Transactions on Nuclear Science, vol. 48, No. 6, pp. 2330-2334.*
Kawarabayashi et al., "Potential on liquid light guide as distrbuted radiation sensor," Oct. 2004, IEEE Nuclear Science Symposium Conference Record, vol. 2, pp. 712-714.*
Spillman et al., "Single photon read-out of a novel image intensifier with delay-line technique: a tool for position and time sensitive neutron and x-ray detection," 2002, IEEE Nuclear Science Symposium Conference Record, vol. 2, pp. 855-859.*
Hillenbach A et al, "High flux neutron imaging for high-speed radiography, dynamic tomography and strongly absorbing materials", Proc. of the 5th International Meeting on Neutron Radiography (ITMNR-5), Jun. 26, 2004-Jun. 30, 2004, pp. 116-122, XP002370119 Garching, Germany, ISSN: 0168-9002 Nuclear Instrumentation and Methods in Physics Research, Section A, vol. 542, issues 1-3, pp. 116-122 (2005).

* cited by examiner

*Primary Examiner*—David P Porta
*Assistant Examiner*—Kiho Kim
(74) *Attorney, Agent, or Firm*—Dekel Patent Ltd.; David Klein

(57) ABSTRACT

An efficient, large-area-detector and readout-system for combined sub-mm spatial imaging and time-of-flight spectrometry of fast and slow neutrons, as well as gamma-rays, capable of loss-free operation in mixed neutron-gamma fields of very high intensity.

10 Claims, 1 Drawing Sheet

TIME-RESOLVED, OPTICAL-READOUT DETECTOR FOR NEUTRON AND GAMMA-RAY IMAGING

FIELD OF THE INVENTION

The present invention relates to an efficient, large-area-detector & readout-system for combined sub-mm spatial imaging and time-of-flight spectrometry for fast or slow neutrons as well as gamma-rays, capable of loss-free operation in mixed neutron-gamma fields of very high intensity. It will henceforth be referred to as TRION: Time-Resolved Integrative Optical (readout for) Neutrons.

BACKGROUND OF THE INVENTION AND PRIOR ART

Fast neutron radiography (FNR) is useful in interrogating bulky objects for which alternative probes, such as slow neutrons or low-E X-rays, are limited in penetration. Due to the weak dependence of fast neutron cross-sections on atomic number Z, the transmission attenuation in the interrogated object is predominantly determined by its mean atomic density. A notable exception prevails at neutron energies <~2 MeV, where hydrogen is the dominant attenuator, if present in appreciable quantities.

The possibility of utilizing characteristic resonances in fast-neutron cross-sections has led to the development of a multi-element-specific fast-neutron radiography and tomography method (FNRT) based on pulsed-beam TOF measurements. (See Overley J. C., "Determination of H,C,N,O Content of Bulk Materials from Neutron Attenuation Measurements", Int. J. Appl. Rad. & Isot. 36 (1985) 185, and Lanza R. C. et al., Illicit Substance Detection, Gordon Research Conf., Conn. College, New London Conn. (July 2000).) It exploits modifications of broad-energy neutron spectra transmitted through an inspected object, due to characteristic cross-section energy-variations of elements present.

With the FNRT method, the object is illuminated by a pulsed broad energy (0.8-4 MeV) neutron beam produced by short repetitive beam bursts of 4-5 MeV deuterons impinging on a thick Be target. Time of flight is used to measure the energy dependence of neutron transmission through an object. The method has been applied to detecting elements such as C, O, N & H for determining the composition of agricultural products and for the detection of contraband. (See Fink C. L., Micklich B. J., Yule T. J., Humm P., Sagalovsky L. and Martin M. M., Nucl. Instr. & Meth. B99 (1995) 748, and Overley J. C., Chmelnik M. S., Rasmussen R. J., Schofield R. M. S. and Lefevre H. W., Nucl. Instr. & Meth. B99 (1995) 728.) A system for detection of explosives in air passenger bags based on this method has also been constructed and tested. (See Overley J. C., Chmelnik M. S., Rasmussen R. J, Sieger G. E., Schofield R. M. S. and Lefevre H. W., SPIE, Vol. 2867 (1997) 219; Miller T. G., Van Staagen P. K. and Gibson B. C., SPIE, Vol. 2867 (1997) 215; and Van Staagen P. K., Miller T. G. and Gibson B. C. and Krauss R. A., Proc. of $2^{nd}$ Explosives Detection Technology Symp. and Aviation Security Technol. Conf., Nov. 12-15, 1996.)

On the instrumental side, fast-neutron-based imaging techniques are, in general, harder to implement than those for thermal neutrons, primarily due to the fact that typical fast-neutron detection efficiencies are in the 0.01% to 20% range, compared to 20-70% for thermal neutrons.

Neutron detectors employed in FNR are mostly based on the following devices:

1. Scintillating screens viewed by CCD
2. Plastic scintillator slabs viewed by CCD
3. Scintillating fiber screens viewed by CCD
4. Hydrogenous or metallic converter foils coupled to charged-particle detectors The above are now discussed in greater detail.

1. Scintillating screens are based on hydrogen-rich—materials such as polypropylene loaded with ZnS(Ag) scintillator. Knock-on protons interact with the scintillator and the emitted light is detected with a CCD camera via an appropriate optical system. (See Yoshii K. and Miya K., Nucl. Instr. & Meth. A346 (1994) 253 and Ambrosi R. M. and Watterson J. I. W., Nucl. Instr. & Meth. B139 (1998) 279.) Light outputs of ~500 photons per incident 1 MeV neutron have been reported. (See Brenizer J. S., Berger H., Gibbs K. M., Mengers P., Stebbings C. T., Polansky D. and Rogerson D. J., Nucl. Instr. & Meth. A424 (1999) 9.) Large screens of up to 30×30 $cm^2$ can be constructed using this technique. The minimum detectable neutron flux is determined by the optical geometry and CCD noise. In most cases a cooled CCD camera is used. An undesirable feature of these detectors is that they tend to have non-negligible efficiencies for gamma-rays. Moreover, ZnS, being a slow scintillator, is unsuitable for fast timing applications.

2. A plastic scintillator slab coupled to a CCD camera is another version of the above detector. A 4 cm thick slab with an active area of 30×30 $cm^2$ was developed. (See Hall J. M., Neutron Tomography: Illicit Substance Detection, Gordon Research Conf., Conn. College, New London Conn., July 2000.) Due to its large thickness the detector has relatively high detection efficiency, but its spatial resolution is poor (2-3 mm). It too suffers from high sensitivity to gamma-rays.

3. The scintillating fiber screen consists of a bundle of solid or liquid-core scintillating fibers coupled to a CCD readout. Position resolution depends on fiber diameter and length. Small diameter ensures good spatial resolution, but this is at the expense of higher cross-talk and reduced light transmission. The length of the fiber determines detection efficiency and penumbra effects. (See Brzosko J. S., Robouch B. V., Ingrosso L., Bortolotti A. and Nardi V., Nucl. Instr. & Meth. B72 (1992) 119, and Holslin D., Armstrong A. W., Hagan W., Shreve D. and Smith S., Nucl. Instr. & Meth. A353 (1994) 118.) The minimum detectable neutron flux is determined by the optical geometry and CCD noise. In most cases a cooled CCD camera is used.

4a. A hydrogenous converter foil detector consists of a hydrogenous radiator coupled to a position-sensitive charged-particle detector (solid-state or gas), which detects the knock-on protons. (See Hosono Y. et al., Nucl. Instr. & Meth. A361 (1995) 554.) The spatial resolution of the detector is determined by the length of proton trajectories in the gas and by the resolution of the position-sensitive readout.

4b. A metallic converter foil detector consists of a foil in which the neutron interacts primarily via the (n,p) reaction. The resulting proton is registered in a position-sensitive detector. By choosing a reaction with a given threshold energy, one can reject scattered neutrons with energies below threshold. Both multi-wire chambers and micro-strip gas detectors have been developed. (See Bertalot L., Bencivenni G., Esposito B. and Pizzicaroli G., Nucl. Instr. & Meth. A409 (1998) 20, and Morris C. L., Armijo V., Atencio L. G., Bridge A., Gavron A., Hart G., Morley K., Mottershead T., Yates G. J. and Zumbro J., Proc. Int. Conf. On Neutrons in Research and Industry, Crete, Grece, (1996), 351.) However, since (n,p) cross-sections are typically below 500 mb and the foils must be thin enough for protons to emerge into the gas with appreciable energy, detection efficiencies are correspondingly low (see Table I below).

Table I compares characteristics of FNR detectors developed over the last decade.

TABLE I

Characteristics of contemporary FNR detectors

| Property | Scintillating Screen/CCD | Slab plastic scintillator/CCD | Scintillating Fibers/CCD | Metallic converter/ gas detector |
|---|---|---|---|---|
| Spatial Resolution FWHM [µm] | 250-2000 | 2000-3000 | 500 (depending on fiber dim's.) | 400 (depending on readout) |
| Efficiency (per incident fast-n) | 1% (2 mm thick) | 20% (40 mm thick) | 4-6% (100 mm long) | 0.2-0.6% (200-2000 µm thick) |
| Gamma sensitivity | Yes | Yes | Yes | No |
| Timing | No | No | No | 10 ns |
| Detector area realized [cm²] | 30 × 30 (limited by optics, CCD) | 30 × 30 | 10 × 10 | 12 × 12 |

From Table I it is evident that most contemporary fast-neutron imaging detectors suffer from low detection efficiency and lack of timing capability. The slab plastic scintillator has relatively high efficiency, but this advantage is offset by its poor spatial resolution. The correlation between these two parameters can be reduced by the use of scintillating fibers, for which the spatial resolution is dependent on fiber diameter and the knock-on proton range in the fiber. Another characteristic of detectors based on scintillators is their sensitivity to gamma-rays. The metallic converter detector counts single events and is therefore able to provide information on neutron energy by measuring its time of flight. Although insensitive to gamma-rays, its detection efficiency is extremely low.

Requirements on imaging detectors for FNRT methods are more stringent than for FNR due to the fact that neutron spectrometry with rather good (typically, 100-500 keV) resolution is a prerequisite for the technique. The requirements from such detectors are:

1. large sensitive area
2. position resolution of <1 mm
3. efficient detection of fast-neutrons over a broad energy range
4. neutron spectroscopy capability within this energy range
5. insensitivity to gamma-rays
6. ability to operate at high counting rates High-speed arrays of detectors for contraband identification using FNRT have been proposed and developed (See Van Staagen P. K., Miller T. G., Gibson B. C. and Krauss R. A., Proc. of $2^{nd}$ Explosives Detection Technology Symp. and Aviation Security Technology Conf., Nov. 12-15, 1996 and Gibson B. C., Miller T. G., Van Staagen P. K. and Krauss R. A., Proc. of $14^{th}$ Int. Conf. on Applications of Accelerators in Research & Industry, Nov. 6-9, 1996.) They consist of a matrix of individual scintillation detectors positioned as a 2-dim. array. Each detector is coupled to a light-guide, photomultiplier and electronics. Pixel dimensions achieved with these arrays are in the few-cm range.

Another arrangement for an x-y FNRT neutron detector was proposed (See Miller T. G., "High Energy X-Y Neutron Detector and Radiographic/Tomographic Device", U.S. Pat. No. 5,410,156, 1995.) The detector consists of a stack of separate, scintillating fiber bundles, which form a plane. One coordinate is determined by the bundle struck by the neutron. The other coordinate obtains by measuring the time difference of scintillation photons in reaching opposite ends of the fiber-optic strand. Position resolution obtained was of the order of 4×4 cm².

The relatively poor position resolution obtained in the above-mentioned devices did not permit reliable detection of small and thin objects. (See "The Practicality of PFNTS for Aviation Security", NAS Panel report, 1999, http://books.nap.edu/html/aviation_spectroscopy/.)

To appreciate the influence of detector properties on performance characteristics of an FNRT inspection system, it is instructive to consider the basics of the time of flight (TOF) method for measuring neutron energy. In TOF, an accelerator ion-beam is pulsed to generate a short (1-2 ns) neutron burst via a nuclear reaction. In the non-relativistic limit, which is valid for $E_n < \sim 10$ MeV, the time required by individual neutrons in a pulse to reach a neutron detector positioned at a fixed distance from the source can be measured and converted to neutron energy via the simple relation:

$$E_n = \frac{1}{2}m\left(\frac{d}{t_{TOF}}\right)^2$$

where d is the source-detector distance, m the neutron mass and $t_{TOF}$ the time-of-flight.

The overall time resolution (a convolution of the duration of the beam burst and the instrumental time resolution of the detector) thus determines the energy-bin size. For example, a TOF distance of 5 meters and overall time resolution of 5 ns translates to an energy-bin size of 0.3 MeV at $E_N$=5 MeV. Most fast-neutron resonances are considerably narrower and can thus not be resolved; however, certain cross-sections of interesting elements such as C, N, O do fluctuate over energy-intervals that correspond to the TOF resolving power of the radiography system. In such cases, the contrast sensitivity for element-specific FNRT will depend predominantly on the instrumental time resolution of the detector, since typical accelerator beam bursts are short (1-2 ns). Thus, the goal for operational FNRT detectors is a timing resolution of ~2 ns. The current figure-of-merit for the present invention, TRION, is ~10 ns, with good prospects for reducing this value to ~5 ns in the near future and possibly even better, eventually.

Single-event-counting (SEC) is the conventional, most widely used TOF mode. Here, it is essential that the probability for a neutron to be detected in a single accelerator beam-burst be low (<~10%). The reason is that, if more than one neutron is detected per burst, only the first will be counted, resulting in pile-up counting losses and spectrum distortion. This restriction severely limits detector counting rates and does not permit operation at high neutron flux intensities. The effect can be countered by a high degree of segmentation of the data-acquisition system, but such a solution is costly.

SEC data acquisition is usually in list mode, the relevant parameters such as position and TOF of each individual event being measured and stored in a multi-dimensional histogram. The advantage of this method is that very good parameter definition can be achieved, usually in subsequent off-line analysis. This is, however, at the expense of considerably reduced operating speed as well as increased data file size.

SUMMARY OF THE INVENTION

The present invention, TRION, seeks to provide an efficient, large-area fast-neutron detector and readout system for combined sub-mm spatial imaging and TOF spectrometry, which is capable of loss-free operation in mixed neutron-gamma fields of very high intensity. Among others, the proposed detector should prove useful in two different sets of pulsed-neutron-beam applications: a) FNR with mono-energetic neutron beams of $E_n=1\text{-}15$ MeV and b) FNRT imaging, which usually employs broad-energy ("white") neutron spectra. TRION may use a novel, integrative (as opposed to single-event counting) optical image recording technique. In contrast to the prior art, TRION, as an integrative method, may permit 2-5 ns resolution TOF spectroscopy at essentially unlimited counting rates, along with sub-mm spatial imaging resolution.

In the applications context, TRION may be characterized as an efficient, large-area fast-neutron detector with few-ns timing resolution and sub-mm position resolution.

Its TOF capabilities will proffer to FNR applications the advantage of improved discrimination against scattered neutrons, thereby enhancing image contrast.

For FNRT applications TRION will enable energy-selective imaging of complex objects to be concomitantly performed in several energy-bins, at virtually unlimited count-rates.

By appropriate modification of the neutron converter, TRION may also permit a variety of new, ultra-fast time-resolved applications for slow (epithermal, thermal, cold and ultra-cold) neutrons, with few-ns timing resolution and sub-mm position resolution, at essentially unlimited counting rates.

BRIEF DESCRIPTION OF THE DRAWINGS

The present invention is herein described, by way of example only, with reference to the accompanying figures, wherein.

DETAILED DESCRIPTION OF EMBODIMENTS

The TRION neutron imaging detector and readout system of the present invention may comprise stroboscopic photography of neutrons arriving at the detector on a few-nanosecond time-scale.

Although stroboscopic time-resolved optical imaging techniques have previously been used to determine various physical properties, no time-resolved neutron imaging has yet been proposed. Furthermore, TRION comprises the capability for sequential integration of neutron transmission images at different neutron energies obtained with a pulsed, broad-energy neutron beam.

In a typical pulsed fast-neutron beam the burst repetition rate is of the order of 2 MHz (much higher rates are not achievable due to frame overlap, i.e. slow neutrons from the preceding pulse overlap in time with fast ones from the present pulse). Within the time window of ~500 ns, depending on the distance between neutron-source and detector and the width of the relevant energy bin, the detector should integrate neutrons into an image in a well-defined time-window relative to the beam pulse. This time-window will correspond to a preselected energy bin, e.g., the energy-interval spanning a cross-section resonance. Typical widths for such a time-window are of the order of 2-10 ns, depending on the isotope to be imaged and the source-detector distance of the system.

A good detector for FNRT should be capable of performing the neutron imaging in as many energy-bins as possible simultaneously for each neutron beam burst.

Figure 1:
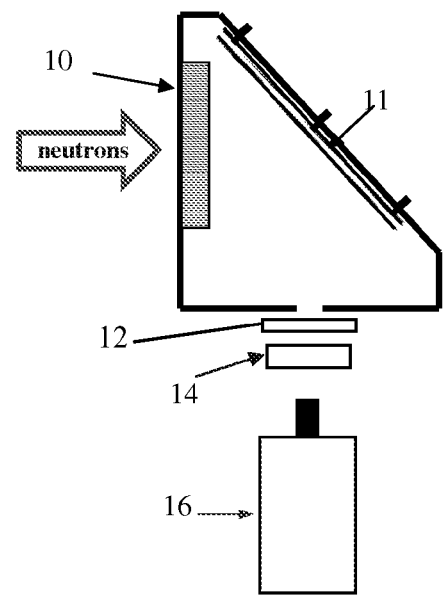
FIG. 1 is a schematic drawing of a fast-neutron imaging detector using a segmented, fast-framing camera, in accordance with an embodiment of the present invention.
Figure 2:
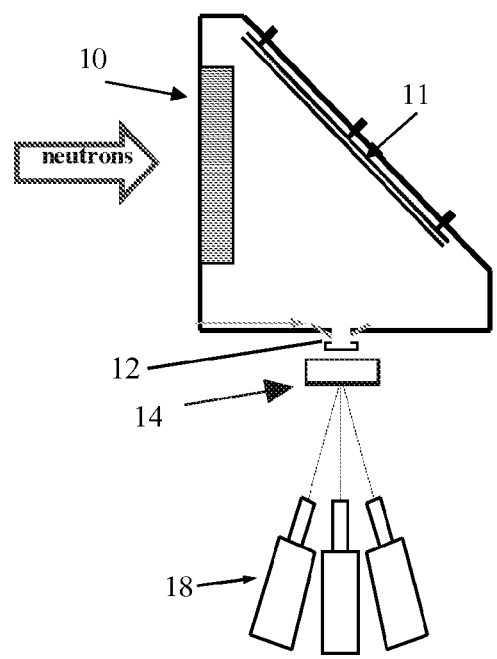
FIG. 2 is a schematic drawing of a fast-neutron imaging detector using several independently-gated, position-sensitive optical sensors, such as intensified CCD cameras, in accordance with another embodiment of the present invention.

FIGS. 1 and 2 schematically describe two non-limiting embodiments of the TRION detector.

As can be seen in FIGS. 1 and 2, both variants incorporate a large-area, light-emitting neutron converter 10, such as a plastic-scintillator slab or a scintillating array of solid or liquid-core fibers. Such converters have fast light-pulse decay time-constants of 1-2 ns. Scintillation light from neutron interactions in the neutron converter is projected via a front-side coated mirror 11 and a large-aperture lens 12 to an ungated optical preamplifier 14. Such a preamplifier is required as the amount of light emitted from the neutron converter is relatively low. It consists of a large-area image-intensifier with an ultra-fast phosphor that ensures decay times shorter or comparable to those of plastic scintillator converter screens (2-3 ns).

Although the front-end detection components of the two variants are identical, they differ in the method of realizing multiple-frame exposure. The latter relates to the simultaneous (or quasi-simultaneous) acquisition of fast-neutron transmission images for a number of energy bins, which is a prerequisite for multi-element FNRT.

In the embodiment of FIG. 1, the image formed on the fast phosphor is viewed by a special intensified, segmented fast-framing camera 16. The latter consists of an image splitter that splits the image into a segmented (e.g., n=8 segments) sensor. Each segment is gated independently, permitting sequential integration of images in n selected time (energy) bins. In this fashion, for each burst of neutrons, the camera takes n images at different delay times, corresponding to time-of-flight windows for n selected neutron energy-bins.

In the embodiment of FIG. 2, the fast light-amplifier can be viewed by several independently-gated, position-sensitive optical sensors 18 (e.g., intensified CCD cameras, each gated at a different pre-selected time after the neutron burst). The use of several standard CCD cameras is an attractive option, since cameras with an 18 mm or 25 mm diameter image-intensifier are commercially available and relatively inexpensive. The difference in images due to slightly varying angles at which each camera views the phosphor will need to be corrected in software.

The neutron converter can be constructed from a fast scintillator in form of a slab or an array of scintillating solid or liquid-core fibers. The use of the latter permits greater converter thickness and thus higher detection efficiency, without adversely affecting position-resolution.

Fast neutrons interact with the converter, producing light that is reflected by a 45° front-coated mirror and collected by a large-aperture lens system into an image-intensifier. By means of this mirror it is possible to locate sensitive electronic parts such as the image-intensifier and the cameras out of the neutron beam, thereby reducing radiation damage to them.

The image from the screen is intensified by the image-intensifier and viewed by one of two variants of gated-camera systems: 1) either a complex fast-framing single camera with image splitter and segmented intensified CCD, or 2) a number of independently-gated position-sensitive optical sensors. In the embodiment of FIG. 1 the series of energy-windows is determined by the number of segments, whereas in the embodiment of FIG. 2 they are defined by a set of independent sensors.

It is noteworthy that TRION does not count individual events but integrates the total number of neutrons in a pre-selected time (energy) window for each pixel. Hence, this detector can operate loss-free at essentially unlimited neutron flux, while preserving the high spatial resolution characteristic of optical readout systems.

The neutron converter consists of a scintillator in which the neutron is detected by converting part of its energy into visible light. For element-specific FNRT via TOF, the duration of this light must be short (of the order of 2-3 ns). It is also important that there are no significant long components in the decay characteristics of the scintillator. A suitable converter for the TRION detector is an organic (solid, liquid or any combination thereof) scintillator, such as one of the plastic scintillators in the commercially-available BC-400 series. For a converter thickness of 10 mm, the detection efficiency is about 5% at 8 MeV. Higher detection efficiency can be obtained by increasing converter thickness, but this will be at the expense of spatial resolution. In order to maintain the spatial resolution at greater thicknesses, the converter can be made of an array of scintillating fibers arranged such that their length is along the incident neutron beam direction. As long as the fiber diameter is smaller than the range of the knock-on protons produced in the scintillator by the incident neutrons, the spatial resolution in such a converter will be of the order of the proton range, irrespective of detector thickness.

As the amount of light emitted from the scintillator screen is limited, it is necessary to amplify the intensity of the image collected by the lens system. This is performed using a large-area image-intensifier. However, to preserve the time resolution of the detector, this optical preamplifier requires a fast phosphor screen with a decay time-constant shorter or comparable to that of the plastic scintillator screen. Fast phosphors for image intensifiers with light decay time-constants of the order of 2 ns for have been developed recently (for instance, E36 by El-Mul, Inc., of Yavne, Israel).

Fast-framing cameras (embodiment of FIG. 1), capable of independently capturing up to 8 images in time-frames of about 10 ns are already available commercially (ULTRA8 from DRS Hadland), but are rather costly. Moreover, at the time of writing, significant modification in the optics and electronics of the camera would be required to enable it to handle repetitive exposure triggers which are time-correlated to the pulsing system.

In contrast, the use of several standard image-intensified CCD cameras (embodiment of FIG. 2) is an attractive option, since cameras with an 18 mm or 25 mm diameter image intensifier are relatively inexpensive. The difference in image due to the slightly varying angle at which each camera views the phosphor will have to be corrected in software. Another important aspect is the timing resolution. By using an ungated, large-diameter image-intensifier and a set of position-sensitive optical sensors with small, fast, gated image-intensifiers, it is reasonable to assume that ultimately, timing resolution of 5 ns or better will be achievable. This is crucial for ensuring adequately-fine energy binning, which in turn, is essential to obtaining high contrast sensitivity for multi-elemental analysis.

TRION is also applicable to performing sub-mm-resolution Gamma-ray and X-ray radiography, as well as imaging of activation products, in mixed neutron/e.m.-radiation fields since, with the beam pulsing regime mentioned above, neutrons can be effectively rejected by appropriate time-gating. By the same token, simultaneous neutron/e.m.-radiation imaging can also be performed with TRION. This could prove beneficial in overall data normalization, as well as in the extraction of element-specific and substance-specific quantities.

By incorporating a different converter scintillator that is sensitive to slow neutrons (epithermal, thermal, cold and ultra-cold), TRION may be adapted to a variety of other neutron imaging applications, in particular, but not limited to, time-resolved phenomena in diffractometry, small-angle-neutron-scattering (SANS) and channeling experiments, studies of grazing-angle neutron reflection from surfaces, thin-film, membrane and cell research, etc. Due to the high counting-rate capability of TRION, one specific set of such applications will particularly benefit from TRION, namely, imaging at forward angles which include the directly-transmitted neutron beam. Hitherto, the latter has proved a notoriously difficult (and in many cases even prohibitive) scenario for imaging detectors operating in SEC mode.

By virtue of its ns-gating capability, TRION should also prove beneficial in studying fast, time-resolved periodic and transient phenomena, such as plasma and gas expansion following explosions and sudden phase transitions, dynamic, non-invasive and non-destructive studies of turbo-molecular pumps, ultra-centrifuges, etc.

In summary, the present invention enables energy spectroscopy and spatial imaging of fast neutrons for FNR & FNRT applications, Gamma-ray and X-ray radiography in mixed radiation fields, as well as spatial imaging of slow neutrons for studying a variety of time-resolved phenomena.

Without limitation, the presented TRION detector has the following properties and advantages:

Sub-mm spatial resolution
Essentially unlimited counting rate capability
Detection efficiency in the 10-15% range
High mutual neutron-gamma discrimination
Timing capability of ~5 ns (possibly even better, eventually)
Large area The scope of the present invention includes both combinations and subcombinations of the features described hereinabove as well as modifications and variations thereof which would occur to a person of skill in the art upon reading the foregoing description and which are not in the prior art.

What is claimed is:

1. Apparatus comprising:
   a fast, organic fiber-scintillator screen permitting high position resolution as well as high neutron-detection efficiency, and an ultra-fast optical preamplifier with fast decay time phosphor, to preserve ns-timing capability.

2. Apparatus according to claim 1, further comprising an intensified, segmented fast-framing camera with an image splitter.

3. Apparatus according to claim 1, further comprising a set of independently-gated, position-sensitive optical sensors.

4. Apparatus according to claim 1, wherein said organic fiber-scintillator screen comprises a solid core.

5. Apparatus according to claim 1, wherein said organic fiber-scintillator screen comprises a liquid-core.

6. Apparatus comprising:
a fast, organic fiber-scintillator screen permitting high position resolution as well as high neutron-detection efficiency, and apparatus for ns-pulsing of image-intensifiers at high repetition rates (>1 MHz) for extended periods (>~1 s).

7. Apparatus according to claim 6, further comprising an intensified, segmented fast-framing camera with an image splitter.

8. Apparatus according to claim 6, further comprising a set of independently-gated, position-sensitive optical sensors.

9. Apparatus according to claim 6, wherein said organic fiber-scintillator screen comprises a solid core.

10. Apparatus according to claim 6, wherein said organic fiber-scintillator screen comprises a liquid-core.

* * * * *